United States Patent [19]
Lockard

[11] 3,934,905
[45] Jan. 27, 1976

[54] EXPANSION JOINT

[75] Inventor: Donald Fredrick Lockard, Littleton, Colo.

[73] Assignee: Johns-Manville Corporation, Denver, Colo.

[22] Filed: Jan. 7, 1974

[21] Appl. No.: 431,192

[52] U.S. Cl. ............................ 285/229; 285/424
[51] Int. Cl.² ....................................... F16L 51/02
[58] Field of Search ........... 285/229, 226, 224, 424; 138/121; 2/2.1 R, 2.1 A

[56] References Cited
UNITED STATES PATENTS

| 2,797,112 | 6/1957 | Ziebold | 138/121 X |
| 3,259,405 | 7/1966 | Heller | 138/121 X |
| 3,365,217 | 1/1968 | Cooper | 285/229 |
| 3,551,009 | 12/1970 | Cammuso et al. | 285/226 X |
| 3,621,542 | 11/1971 | Getchell | 138/121 |
| 3,647,247 | 3/1972 | Pintard et al. | 285/229 |
| 3,672,707 | 6/1972 | Russo | 285/229 |

Primary Examiner—Dave W. Arola
Attorney, Agent, or Firm—Robert M. Krone; James W. McClain

[57] ABSTRACT

An expansion joint is described comprising a flexible, metal-free tubular connector having corners and sides, said connector joining the end of adjacent ducts, and with each corner comprising a central section and two expansion sections. As the expansion joint expands and contracts, the central and expansion sections of each corner extend and retract, changing in shape to accommodate the joint movement and to prevent stress concentrations at corners.

7 Claims, 10 Drawing Figures

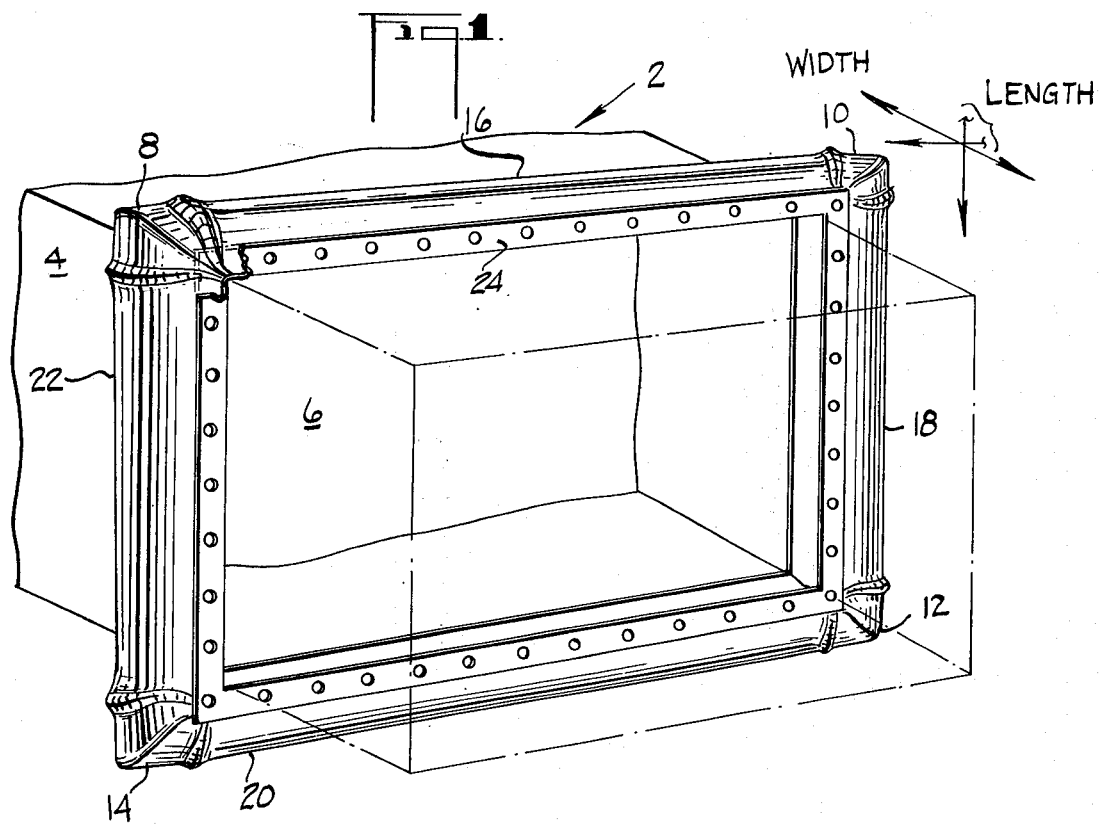
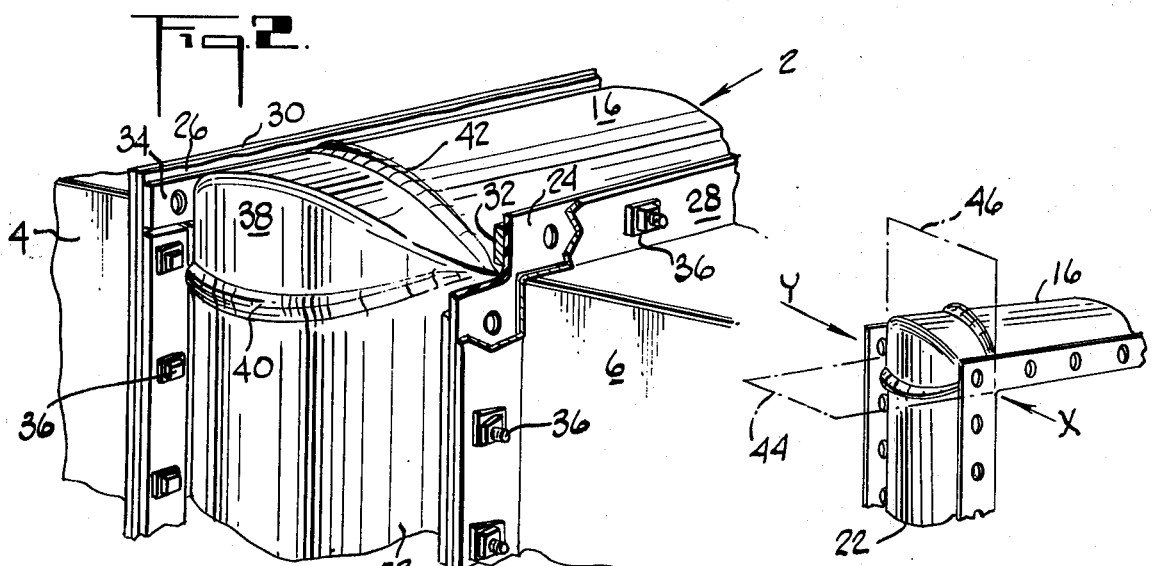

EXPANSION JOINT

BACKGROUND OF THE INVENTION

1. Field of the Invention

The invention herein relates to tubular connectors, commonly referred to as "expansion joints," which serve to join the spaced-apart adjacent ends of two sections of air or other gas duct-work.

The use of expansion joints allows for relative movement of the two sections of ductwork in a longitudinal, rotational or lateral direction or simultaneously in any direction. Such expansion joints thus allow for the movement which is due to heating and cooling of ducts, vibration which may occur, and misalignment in duct installation.

2. Description of the Prior Art

Many kinds of expansion joints have been used at one time or another in industrial and commercial installations. Until recently most comprised a fabric section to which were joined metal angle irons forming flanges on the outer extremities of the joint. These metal flanges were attached to corresponding flanges on the adjacent ends of the duct sections to be joined. Typical metal flanged expansion joints have been marketed commercially by the Johns-Manville Corporation under the trade designation of Models "A-250" and "B-500."

The use of such metal flanges increases the weight and complexity of the expansion joint. Consequently, recently there was developed an expansion joint in which the flexible fabric of the joint itself attaches to the flanges of the ductwork, thus simplifying both the construction of the expansion joint and installation, and substantially reducing the weight and expense of the typical expansion joint. These recently developed expansion joints are shown in U.S. Pat. No. 3,647,247 to Pintard and Mollick. Such expansion joints have found considerable success in the marketplace.

The expansion joints described in the aforecited patent have, however, been found to be susceptible to failure at the corners thereof. To overcome this, corner reinforcements, both fabric and metal, have at times been used with such expansion joints. Incorporation of such reinforcements, however, is not desirable for it reduces the expansion joint's advantages by once again increasing the cost of production and adding to the complexity of the finished expansion joint. Further, the use of such reinforcements has not entirely solved the problem of failure of the expansion joints at the corners.

OBJECTS OF THE INVENTION

It is an object of the present invention to describe an expansion joint which is simple in construction, requires no corner reinforcement and may be attached directly to the ductwork without the use of metal flanges on the expansion joint.

It is further an object of this invention to describe an expansion joint which may be readily and simply fabricated.

It is further an object of this invention to describe an expansion joint which may be operated in both positive and negative pressure regimes.

It is further an object of this invention to describe an expansion joint which may be attached to the duct ends other than by flange structures.

BRIEF SUMMARY OF THE INVENTION

The invention herein comprises a flexible expansion joint having no metal flanges, and being useful for joining the ends of adjacent ducts. The expansion joint comprises a tubular connector which has a specific configuration including a plurality of corners; a plurality of sides, each of which connects two of the corners, and has a base; and terminal end portions adapted to mate with the ends of the ducts. Each of the corners comprises a central section embodying one corner extremity of the expansion joint and two expansion sections. The latter are each positioned between and abutting the central section and one of the sides. The central section and each of the expansion sections comprise cooperative means for permitting axial movement (extension and contraction) and rotation of the connector while maintaining a constant surface area of the corner. In a preferred embodiment, the central section has two lateral portions which meet at a joint line which extends to an actual corner extremity of the joint. Each of the expansion sections has a configuration comprising a center line coplanar with the plane of the base of the side of the joint which the other expansion section in the corner abuts; slope portions meeting at and extending from the center line to the extremities of the expansion section; and two ends, each of which is joined to a respective end of the central section and the other expansion section at the intersection of the bases of the two sides meeting at the corner. During movement of the connector each of the expansion sections varies in breadth but maintains a constant surface area and surface length, and the rate of change of curvature of the center line of the expansion section is greater during extension or contraction of the joint than is the rate of change of curvature of the side of the joint adjacent to the expansion section.

BRIEF DESCRIPTION OF THE DRAWINGS

FIG. 1 is a perspective view showing a typical rectangular expansion joint of the present invention in installed position in a typical air duct. A small portion of one corner of the expansion joint is shown cut away to more clearly illustrate the construction of the joint.

FIG. 2 is an enlarged perspective view of one corner of the expansion joint of FIG. 1, showing in detail the cut-away section.

FIG. 3a and 3b are, respectively, perspective and elevation views of one corner illustrating graphically the respective planes, angles and dimensions referred to herein.

The pairs of FIGS. 4 and 4a, 5 and 5a, and 6 and 6a illustrate the variation in shape of the several portions of a single corner as the expansion joint moves from a relatively contracted position through an intermediate position to a relatively expanded position.

DETAILED DESCRIPTION AND PREFERRED EMBODIMENTS

Figure 3B:
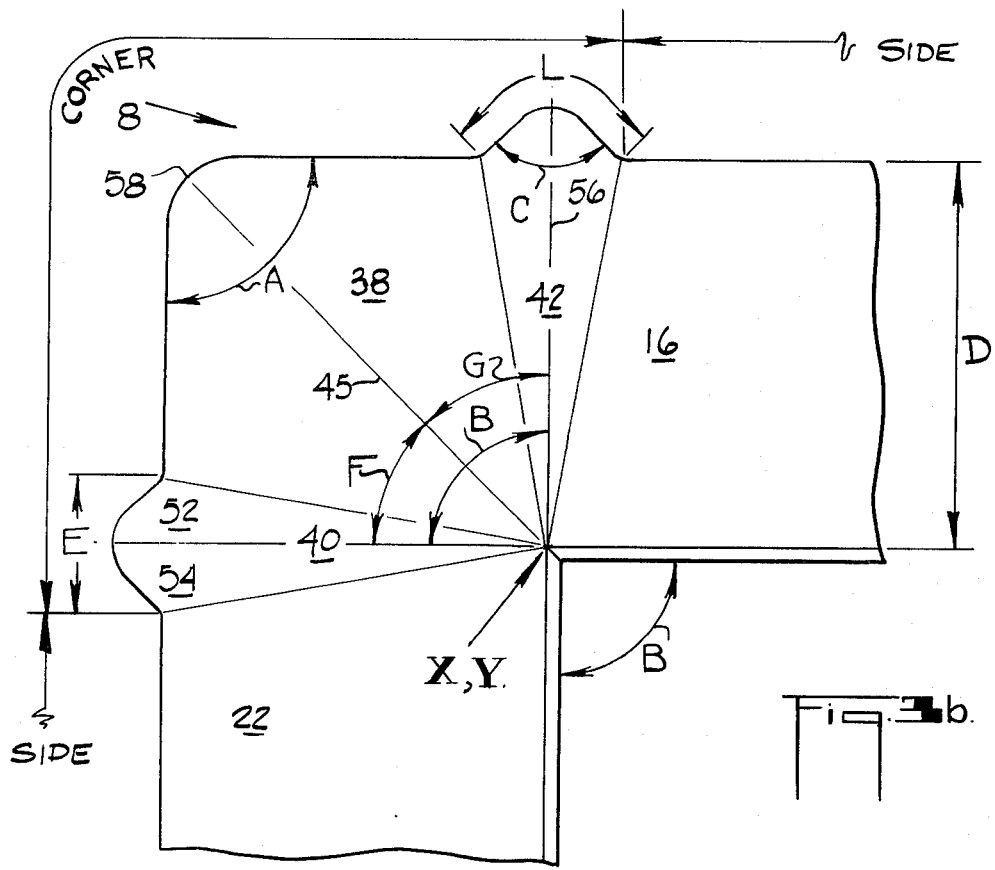

The specific structure of the expansion joint of the present invention can be best understood by reference to the several figures of the drawings. In FIG. 1 a rectangular expansion joint generally designated 2 is shown installed between adjacent duct sections 4 and 6. The duct sections are shown partially in phantom and it will be understood that each has a terminal end to which an end of the expansion joint is joined. Normally the attachment will be by means of flange-to-flange coupling, as shown in the Figures. However, other attachment means can be employed, as long as the particular means chosen does not require modification of the novel expansion joint structure which is the subject of this invention. The construction of the ductwork itself is conventional and does not form a part of the present invention. In the drawings and description herein, the tubular expansion joint of this invention and the associated ductwork are shown and referred to as rectangular or square, i.e. having four right-angled corners. However, the structure of the expansion joint described herein is applicable to any ductwork and expansion joint configuration having a plurality of sides and corners, for instance three, four, five, six or more. The sides need not be the same length nor need any two sides be parallel. However, the two adjacent ducts must have the same configuration, or at least the end portions to which the expansion joint is connected must have the same configuration, so that each corner is symmetrical about a transverse plane through the center of the width of the expansion joint. While the expansion joint herein is shown as having 90° corners, it will be understood that each corner of the expansion joint will conform in angle to the angle of the particular corner of the ductwork to which it is adjacent. Thus, a particular corner could include an angle of 120° if the ductwork were an equilateral triangle shape or 72° if the ductwork were a regular pentagonal shape, and so forth.

Referring to FIGS. 1, 2, 3a and 3b, it will be seen that the expansion joint in the rectangular embodiment shown comprises four corners respectively designated 8, 10, 12 and 14, and four sides respectively designated 16, 18, 20 and 22. For the purposes of this invention, the portion designated as a "corner" will be that portion extending as indicated in FIG. 3b and that the portion designated as a "side" will be the remaining portion lying between successive corners. At each width extremity of the expansion joint is an upturned flange portion designated 24 or 26. Each of these flange portions mates respectively with a corresponding flange portion of the ductwork designated 28 and 30. Since the flanges 24 and 26 are of the same flexible material as the expansion joint itself, their attachment to the flanges 28 and 30 of the ductwork is usually aided by use of clamping bars 32 and 34. Attachment is conventionally by nuts and bolts 36 although studs or other attachment means may also be used.

Thus far, the construction and installation of the expansion joints of this invention follow closely the disclosures of the aforesaid Pintard and Mollick patent The heart of the present invention, however, resides in the novel and unobvious corner structure to be described below. The corner structure is best understood by reference to FIGS. 2, 3a and 3b. In FIGS. 2 and 3b the corner will be seen to be comprised of central section 38 and two expansion sections 40 and 42.

It will be helpful to refer to FIGS. 3a and 3b for a description of the various angles and dimensions to be discussed. Angle A is the corner angle of the corner in question. Angle B is the angle between the planes 44 and 46, the extended planes of the bases of the two adjacent sides 16 and 22. As seen most clearly in FIG. 3a, sides 16 and 22 each have a generally cylindrical shape with the "base" being the longitudinal cutting plane which defines a segment of the cylinder. Other cross-sectional shapes of sides may also be suitable, with appropriate changes in the cross-sectional shape of the corners, as long as the functional structure of the corners is not adversely affected. In such cases the planes 44 and 46 are defined by the edge lines of the sides passing through points X and Y. Angle B is the angle of intersection of these two base planes at points X and Y. (Point Y lies on the opposite side of the corner in FIG. 3b, directly behind point X.) Angle C is the angle of the expansion section. (Since the principle of operation of each expansion section is the same, only dimensions and angles for one such section will be described. Note that in some cases where the adjacent sides are of different sizes the actual numerical values of the angles and dimensions of the two expansion sections of each corner will be different, but the operation of the two sections will be alike.) Dimension D is the projected height of one side from the base plane (in this case plane 44). Dimension E is the projected breadth of the expansion section. Contrasted with this is Dimension L, which is the surface length of a cross section of the crowned portion of the expansion section. Angle F or Angle G is the angle of projection of the corner, from points X and Y to the corner extremity along joint line 45. The shape of the corner can be defined by designation of either Angle F or Angle G, and the other will be determined by difference from Angle B. Preferably Angles F and G are equal, so that Dimension D of side 16 is the same as Dimension D of side 22. Throughout the specification and drawings herein, primed and double primed letters will be used to designate the various angles and dimensions in different expansion and contraction positions of the expansion joint. It will be noted that throughout ordinary expansion and contraction of the expansion joint, the Angle B will remain unchanged. Since it is a function of the fixed shape of the ductwork, lateral offset of the two adjacent duct ends will rotate planes 44 and 46 in the longitudinal direction but will not alter the transverse angle of intersection B. Neither will points X and Y cease to be intersection points, although their lateral and/or longitudinal spacing may vary.

Figure 4:
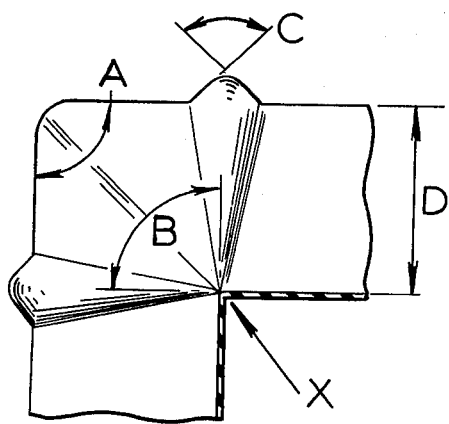
FIGS. 4, 5 and 6 are sectional views taken on, respectively, section lines 4—4, 5—5 and 6—6 of FIGS. 4a, 5a and 6a. The degrees of movement and angular change are exaggerated to illustrate the operation more clearly.
Figure 4A:
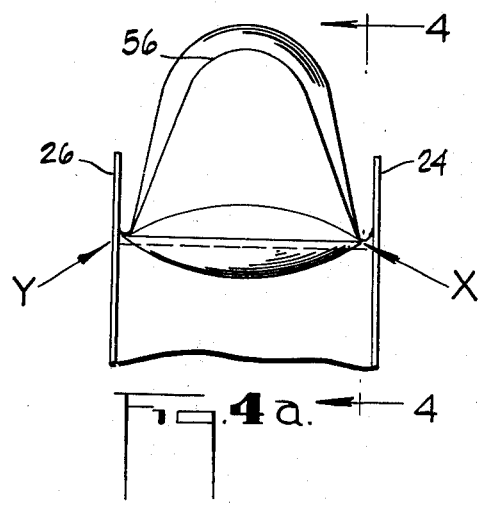
Figure 5:
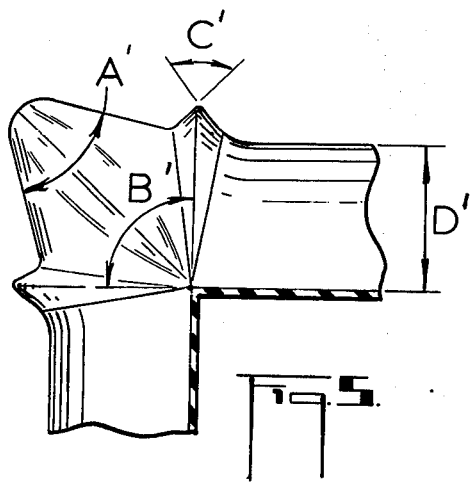
Figure 5A:
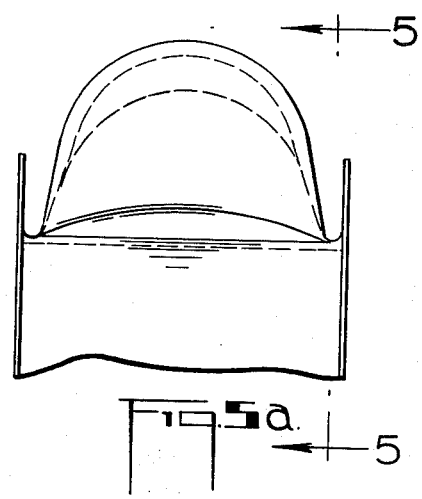
Figure 6:
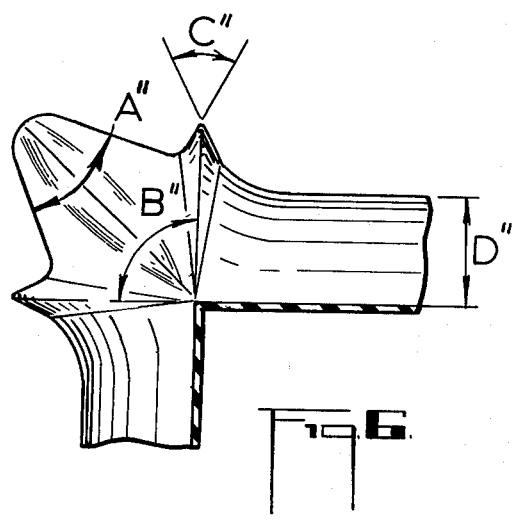
Figure 6A:
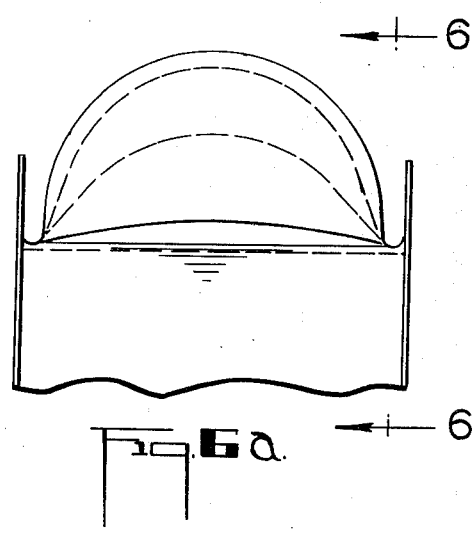

The ends of the various segments of the corner construction of the expansion joint of this invention all meet at and radiate respectively from points X and Y as shown in FIGs. 4a, 5a and 6a. It will be recognized, of course, that the planes 44 and 46 exist only as spatial relationships and do not, in fact, constitute physical structures. The actual side or wall segment will be a curved surface having the thickness of the layers of flexible material used, as best shown in FIG. 6.

Corner section 38 will, when the expansion joint is fully contracted, having a projected transverse corner angle A equal to the corner angle of the duct. Thus, in FIG. 4, corner angle A is shown as a 90° angle and the sides 48 and 50 of corner section 38 appear as extensions of sides 16 and 22 respectively. By "fully contracted" as used herein is meant the position of the expansion joint when the two adjacent ends of the ducts are at their minimum design separation. Similarly, by "fully extended" is meant that position of the expansion joint when the duct ends are at their maximum longitudinal design separation. The term "intermediate extension," of course, refers to a position of the expansion joint intermediate the maximum and minimum longitudinal design separations of the duct ends.

When the expansion joint is fully contracted, as shown in FIGS. 4 and 4a, the height D of the sides of the expansion joint is at a maximum. Each of the expansion sections 40 and 42 is at its maximum width E. Each of the expansion sections comprises two slope portions 52 and 54 which are of equal length (½ L) and meet at center line 56. Slope portions 52 and 54 will usually contain a slight excess of material so that they generally form a hump or crown rising above the surface of the sides such as 16 and 22. This forms crown angle C which is the transverse projection of the hump formed by slope portions 52 and 54. While it is preferred that there be a slight crown even when the expansion joint is fully expanded, a flat or smooth configuration is also possible if the expansion section is molded so as to have a "memory." This is obtained by molding the corner with a slight crown in an intermediate extension condition, so that later contraction will induce a small stress in the expansion section which will cause it to resume the crowned configuration upon subsequent extension.

The expansion joint of this invention achieves its notable success by cooperation of the three sections of the corner. Thus as the expansion joint begins to extend, the three sections each contract in breadth. The expansion sections contract and the crown angles become more acute. This is illustrated in FIGS. 5 and 6, showing respectively an intermediate stage of extension and the maximum extension. It will be seen clearly that angle C″ is more acute than angle C′ which is in turn more acute than angle C. Similarly, the dimension E is greater than dimension E′ which in turn is greater than dimension E″, although dimension L (and the corresponding surface area and surface length of the corner section) is not changed. The corner angles A, A′ and A″ show a successive increase in acuteness while the dimensions D, D′ and D″ show a successive decrease in the radial height of each side. Further, corner extremity 58 no longer lies in a plane with the sides 16 and 22 but extends outwardly therefrom. However, the center line of each of the expansion sections continues to lie in the plane 44 or 46 and the angle B remains unchanged. Also the projected angles F and G remain unchanged. Contraction of the expansion joint reverses the above procedure as to each angle and dimension until the configuration shown in FIG. 4 is resumed.

It will thus be seen that the novel corner structure described herein permits free expansion and contraction of the expansion joint and eliminates stresses and distortions in the corner portions by the cooperation of the central section and expansion sections as "material reservoirs" to provide additional material for expansion of the joint and to take up the excess material during contraction. Because of the flexible nature of the connector, a limited amount of rotational movement can also be accommodated. The stresses, bulges, folds and the like found in corner structures of prior art in expansion joints, and which lead to the rapid failure of the corners of those expansion joints, are thus entirely eliminated. The corners of the present expansion joint are thus no more susceptible to failure than any other portion of the expansion joint and the corners, therefore, need not have any special reinforcement or other external protective means.

The expansion joint herein may be composed of any of a wide variety of flexible sheet fabric materials. These may include various coated or uncoated woven fabrics, rubbers or other elastomeric materials, flexible metal foils, glass cloths, wire mesh cloths and the like. The particular material chosen will be dependent upon the type of service into which the expansion joint is to be placed. Those expansion joints which are used in ductwork handling high-temperature gases will, of course, be made of materials resistant to the temperatures encountered. Similarly, for those expansion joints used in ductwork wherein the gas conveyed contains abrasive or corrosive particles of liquids or solids, or where the gas itself is corrosive, the particular flexible fabric used will be one resistant to the particular corrosion or erosion to be encountered. Typical of the many fabric materials which may be used are asbestos cloths coated with polychloroprene rubbers ("Neoprene"), fluoroelastomers (e.g., "Viton"), and hydrocarbon rubbers ("Nordel"). This list is not meant to be inclusive but rather merely exemplary. Those skilled in the art will be well aware of the many suitable types of flexible fabrics which may be utilized to form the expansion joints of the present invention and the service conditions under which each particular fabric is most appropriately used.

A tubular connector for expansion joints of the type described above having a 3 feet by 3 feet rectangular opening can be formed from a sheet material comprising asbestos cloth coated with Viton fluoroelastomer having a nominal thickness of one-eighth inch. When connected to a simulated duct system having cycling means so as to move the adjacent duct sections toward and away from each other to simulate the effect of temperature change in service, and under the following operating conditions:

| | |
|---|---|
| internal pressure | 3 psi |
| leakage test pressure | 3 psi |
| system temperature | 400°F |
| cycle | one cycle every 150 seconds to simulate change from ambient temperature to 400°F | a satisfactory tubular connector will function without leakage for at least 10,000 cycles.

What is claimed is:

1. A flexible expansion joint for joining the ends of spaced-apart adjacent ducts, which comprises:
   a. a tubular connector having a specific configuration which includes: a plurality of corners; a plurality of sides each of which connects two of said corners; and terminal end portions adapted to mate with the facing ends of said ducts; and
   b. means comprising a center section and two adjacent expansion sections incorporated in each of said corners with each of said sections extending axially of the connector to permit axial movement of said connector while maintaining a constant surface area of said connector.

2. The expansion joint of claim 1 wherein said center section and said expansion sections cooperate to permit said axial movement.

3. A flexible expansion joint for joining the ends of spaced-apart adjacent ducts, which comprises:
   a. a tubular connector having a specific configuration which includes: a plurality of corners; a plurality of sides, each of which connects two of said corners, and has a base; and terminal end portions adapted to mate with said ends of said ducts;
   b. each of said corners comprising:

i. a central section embodying one corner extremity of said expansion joint; and
ii. two expansion sections, each positioned between and abutting said central section and one of said sides, and each having a configuration comprising a center line coplanar with the plane of said base of the side of said joint which the other expansion section in said corner abuts; slope portions meeting at and extending from the center line to the extremities of said expansion section; and two ends, each of which is joined to a respective end of said central section and said other expansion section at the intersection of said bases of said sides meeting at said corner; and wherein c. during extension or contraction of said connector each of said expansion sections varies in breadth but maintains a constant surface length, and the rate of change of curvature of said center line of said expansion section is greater during extension or contraction of said joint than is the rate of change of curvature of the side of said joint adjacent to said expansion section.

4. The expansion joint of claim 3 wherein said tubular connector is comprised essentially completely of flexible sheet fabric material.

5. The expansion joint of claim 3 wherein said tubular connector has a substantially rectangular shape.

6. The expansion joint of claim 3 wherein said tubular connector has a substantially square shape.

7. The expansion joint of claim 3 wherein said expansion sections are of substantially equal dimensions.

* * * * *